United States Patent
Cotanis

(10) Patent No.: US 6,959,189 B2
(45) Date of Patent: Oct. 25, 2005

(54) SYSTEMS AND METHODS FOR DETERMINING SIGNAL COVERAGE

(75) Inventor: Nicolae G. Cotanis, Vienna, VA (US)

(73) Assignee: LCC International, Inc., McLean, VA (US)

(*) Notice: Subject to any disclaimer, the term of this patent is extended or adjusted under 35 U.S.C. 154(b) by 634 days.

(21) Appl. No.: 09/929,034

(22) Filed: Aug. 15, 2001

(65) Prior Publication Data

US 2002/0042268 A1 Apr. 11, 2002

Related U.S. Application Data

(60) Provisional application No. 60/225,305, filed on Aug. 15, 2000.

(51) Int. Cl.$^7$ .................................................. H04Q 7/20
(52) U.S. Cl. ...................... 455/436; 455/440; 455/441; 370/332
(58) Field of Search .................. 455/9–10, 63.1–65, 455/67.11–67.14, 114, 115.1–115.4, 404.2, 421, 423, 425, 440–441, 456.1–457, 501–506, 436; 370/241–253, 310.2, 317, 332

(56) References Cited

U.S. PATENT DOCUMENTS

| | | | | |
|---|---|---|---|---|
| 5,095,500 A | * | 3/1992 | Tayloe et al. | ............. 379/32.01 |
| 5,561,839 A | * | 10/1996 | Osterberg et al. | ........... 455/446 |
| 5,602,831 A | * | 2/1997 | Gaskill | ........................ 370/252 |
| 5,745,867 A | | 4/1998 | Mills | |
| 5,758,264 A | * | 5/1998 | Bonta et al. | ................ 455/67.7 |
| 5,760,742 A | | 6/1998 | Branch et al. | |
| 5,897,612 A | | 4/1999 | Schwengler et al. | |
| 5,960,341 A | * | 9/1999 | LeBlanc et al. | .......... 455/426.1 |
| 5,987,306 A | | 11/1999 | Nilsen et al. | ............... 455/67.1 |
| 6,072,778 A | * | 6/2000 | Labedz et al. | ............... 370/252 |
| 6,073,012 A | | 6/2000 | Vanden Heuvel et al. | |
| 6,081,717 A | | 6/2000 | Shah et al. | ................. 455/446 |
| 6,125,279 A | | 9/2000 | Hyziak et al. | |
| 6,173,185 B1 | * | 1/2001 | Bernardin et al. | ........... 455/446 |
| 6,266,514 B1 | * | 7/2001 | O'Donnell | ............... 455/67.13 |
| 6,336,035 B1 | | 1/2002 | Somoza et al. | |
| 6,522,875 B1 | | 2/2003 | Dowling et al. | |
| 2002/0115447 A1 | | 8/2002 | Martin et al. | |

OTHER PUBLICATIONS

P. Stockl, "GSM/DCS 1800 coverage measurement system", Dec. 1, 1992, pp. 323–330.*

Notice of Allowance, mailed Mar. 24, 2005, U.S. Appl. No. 09/987,111, filed Nov. 13, 2001.

Office Action mailed Jul. 7, 2004, U.S. Appl. No. 09/987,111, filed Nov. 13, 2001 (8 pages).

Saunders, "Antennas and Propagation for Wireless Communication Systems," pps. 85–100, 1999.

Davis et al., "Propagation at 500 MHz for Mobile Radio," IEEE Proc. 132, Pt. F. No. 8, pps. 307–320, 1985.

(Continued)

Primary Examiner—Stephen M. D'Agosta
(74) Attorney, Agent, or Firm—Finnegan, Henderson, Farabow, Garrett & Dunner, L.L.P.

(57) ABSTRACT

Methods and systems are provided for processing signal strength information from a radio frequency transmitter and for determining signal coverage for a wireless device. In one embodiment, the method includes receiving signal strength information indicating a power for the radio frequency transmitter at one or more first locations; receiving location information representing a geographic location for one or more second locations; dividing the received signal strength information into one or more subsets of signal strength information; determining, for each of the one or more subsets, a local mean such that the local mean represents an average for one of the one or more subsets; and estimating a location for the local mean based on the received location information.

12 Claims, 13 Drawing Sheets

OTHER PUBLICATIONS

Parsons et al., "Signal Strength Prediction in Urban Areas Using a Topographical and Environmental Data Base," IEEE Proc. 130, Pt. F, No. 5, 1983.

Cotanis, Nicolae D., "Estimating Radio Coverage for New Mobile Wireless Services Data Collection and Pre–processing," IEEE ICT 2001, IEEE International Conference on Telecommunications, Proceedings, vol. 1, Bucharest, Romania, Jun. 4–7, 2001, pps. 483–488.

Parsons, J.D., "Sounding, Sampling and Simulation," The Mobile Radio Propagation Channel, 1994, pps. 212–15; 252–253.

P. Stockl, "GMS/DCS 1800 Coverage Measurement Systems", Proceedings of the Nordic Seminar on Digital Mobile Radio Communications, Dec. 1, 1992, pp. 323–330.

* cited by examiner

Data Collection

| | PC Time | | | | | | | |
|---|---|---|---|---|---|---|---|---|
| PV | 60449.56 | 40.77072 | -74.0281 | | | | | |
| TR | 60450.39 | 2 | | 38 | -115.93 | -116.0 | -120.0 | -121.0 | -121.1 |
| | 60450.39 | | | | -112.78 | -116.0 | -116.5 | -117.1 | -117.5 |
| PV | 60451.56 | 40.77087 | -74.0285 | | | 297 | | | |
| | | | | | -113.87 | | | | |
| | | | | | -115.91 | | | | |
| TR | 60451.71 | 2 | | 40 | -108.67 | -110.41 | -110.61 | -110.71 | -110.81 |
| | 60451.71 | | | | -115.76 | -114.52 | -114.42 | -114.32 | -114.22 |
| TR | 60452.53 | 2 | | | -111.2 | -114.54 | -114.64 | -114.74 | -114.84 |
| | 60452.53 | | | | -110.95 | -108.60 | -108.60 | -107.9 | -106.50 |
| PV | 60453.56 | 40.77102 | -74.0288 | 39 | | 298 | | | |
| | | | | | | | | | 299 |

Fig. 5A

| Record No | Long | Lat | Local Mean | v (mph) | Lagr-Intp | Average | Difference |
|---|---|---|---|---|---|---|---|
| 1 | -74.0283 | 40.77081 | -113.8 | 39.14 | 0 | | |
| 2 | -74.0284 | 40.77084 | -113.06 | 39.52 | 0 | | |
| 3 | -74.0285 | 40.77087 | -111.58 | 39.65 | 1 | | |
| 4 | -74.0286 | 40.7709 | -110.78 | 39.77 | 0 | | |
| 5 | -74.0286 | 40.77094 | -111.6 | 39.58 | 0 | | |
| 6 | -74.0287 | 40.77097 | -112.66 | 39.36 | 0 | | |
| 7 | -74.0288 | 40.771 | -112.76 | 39.17 | 0 | | |

Fig. 6

| Long | Lat | Local Mean | v (mph) | Lagr-Intp | Window Average | Difference |
|---|---|---|---|---|---|---|
| -74.0283 | 40.77081 | -113.8 | 39.14 | 0 | -113.4 | 0.4 |
| -74.0284 | 40.77084 | -113.06 | 39.52 | 0 | -112.2 | 1.06 |
| -74.0285 | 40.77087 | -111.58 | 39.65 | 1 | | |
| -74.0286 | 40.7709 | -110.78 | 39.77 | 0 | | |
| -74.0286 | 40.77094 | -111.6 | 39.58 | 0 | | |
| -74.0287 | 40.77097 | -112.66 | 39.36 | 0 | | |
| -74.0288 | 40.771 | -112.76 | 39.17 | 0 | | |

Fig. 7B

SYSTEMS AND METHODS FOR DETERMINING SIGNAL COVERAGE

CROSS REFERENCE TO RELATED APPLICATION

This application claims the benefit of U.S. Provisional Patent Application No. 60/225,305, entitled "SYSTEM AND METHOD FOR ESTIMATING RADIO COVERAGE AND PROPAGATION," filed on Aug. 15, 2000, the disclosure of which is expressly incorporated herein by reference in its entirety.

BACKGROUND OF THE INVENTION

A. Field of the Invention

The present invention relates generally to processing signal strength information received from a radio frequency transmitter. More particularly, the present invention relates to systems and methods for processing signal strength information and position information to determine signal coverage.

B. Description of the Related Art

A wireless device, such as a mobile phone, a radio, or a television, must be capable of receiving a signal to operate effectively. In the case of mobile phones, wireless service providers measure power for the signal at various locations and then estimate whether the signal can be received in one or more geographic areas, such as cells or microcells. The wireless service provider may then adjust the power of the transmitter of the signal such that the mobile phones can receive the signal within the one or more geographic areas. This process helps ensure that the wireless device can receive the signal and thus operate effectively.

Past approaches to the process of estimating signal strength within a geographic area provided poor estimates. That is, these estimates varied greatly within an area, forcing the wireless service provider to provide unnecessary extra transmitter power to account for the variations in the estimates. If a wireless service provider fails to add extra transmitter power, a user of the mobile phone may be able to receive the signal in some geographic areas but suffer a service interruption in other geographic areas because the signal may be too weak. However, increasing power at a transmitter may increase operating costs. Accordingly, there is a need for systems and methods for determining estimates of signal coverage with less variability, permitting wireless service providers to precisely provide power to an area.

SUMMARY OF THE INVENTION

To address one or more limitations of the prior art, there is provided a method for processing signal strength information from a radio frequency transmitter. The method includes, for example, receiving signal strength information indicating a power for the radio frequency transmitter at one or more first locations; receiving location information representing a geographic location for one or more second locations; dividing the received signal strength information into one or more subsets of signal strength information; determining, for each of the one or more subsets, a local mean such that the local mean represents an average for one of the one or more subsets; and estimating a location for the local mean based on the received location information.

In another embodiment, there is provided a method for determining a signal coverage for a wireless device. The method including, for example, receiving signal strength information for a signal; receiving location information representing a geographic location for one or more first locations; determining one or more local means based on the received signal strength information; estimating one or more second locations for the one or more local means based on the one or more first locations; transforming the one or more second locations into a route; and calculating the signal coverage for the route based on a signal coverage for at least one of the one or more second locations.

In still another embodiment, there is provided a system for processing signal strength information from a radio frequency transmitter. The system including, for example, means for receiving signal strength information indicating a power for the radio frequency transmitter at one or more first locations; means for receiving location information representing a geographic location for one or more second locations; means for dividing the received signal strength information into one or more subsets of signal strength information; means for determining, for each of the one or more subsets, a local mean such that the local mean represents an average for one of the one or more subsets; and means for estimating a location for the local mean based on the received location information.

Moreover, in another embodiment, there is provided a system for determining a signal coverage for a wireless device. The system including, for example, means for receiving signal strength information for a signal; means for receiving location information representing a geographic location for one or more first locations; means for determining one or more local means based on the received signal strength information; means for estimating one or more second locations for the one or more local means based on the one or more first locations; means for transforming the one or more second locations into a route; and means for calculating the signal coverage for the route based on a signal coverage for at least one of the one or more second locations.

Furthermore, in an embodiment, there is provided a system for processing signal strength information from a radio frequency transmitter. The system including, for example, at least one memory including, for example, code that receives signal strength information indicating a power for the radio frequency transmitter at one or more first locations, code that receives location information representing a geographic location for one or more second locations, code that divides the received signal strength information into one or more subsets of signal strength information, and code that determines, for each of the one or more subsets, a local mean such that the local mean represents an average for one of the one or more subsets; and at least one processor that executes the code.

In still another embodiment, there is provided a system for determining a signal coverage for a wireless device. The system including, for example, at least one memory including, for example, code that receives signal strength information for a signal, code that receives location information representing a geographic location for one or more first locations, code that determines one or more local means based on the received signal strength information, code that estimates one or more second locations for the one or more local means based on the one or more first locations, code that transforms the one or more second locations into a route, and code that calculates the signal coverage for the route based on a signal coverage for at least one of the one or more second locations; and at least one processor that executes the code.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIG. 5A illustrates a table of collected information, in accordance with methods and systems consistent with the present invention;

FIG. 6 illustrates a table of information processed, in accordance with methods and systems consistent with the present invention;

FIG. 7B illustrates another table of information processed, in accordance with methods and systems consistent with the present invention;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

In accordance with an embodiment of the present invention, a user of the system may collect a signal from a radio frequency transmitter and measure signal strength for the received signal. The system may also collect the signal from various locations, such as over an area or over a route. For example, the user of the system may drive along a highway, measuring received signal strength information at various points along the highway. While measuring the received signal strength information, the system may also record the location of the system with a global positioning system receiver.

When the user of the system completes data collection, the system may preprocess the received signal strength information and position information. The preprocessed information may then be further processed to determine a statistic, such as a standard deviation based on the received signal strength information. The system may use the processed information to then determine an indication of signal coverage at one or more geographic locations. In one embodiment, the indications of signal strength may be based on the standard deviation. The system may use the standard deviation to provide an indication of signal coverage that reduces the effects of terrain and that includes the effects of variations from obstructions on the terrain (e.g., man made or natural structures including trees, building, bridges, and etc.). Moreover, the indication of signal strength may be provided to a user, such as a wireless service provider, in the form of signal coverage information, enabling the user to determine whether one or more wireless devices (or receivers) may receive the signal from the radio frequency transmitter.

Signal coverage information may provide an indication of the coverage of a signal—i.e., whether a signal may be detected and/or processed by one or more wireless devices, such as a radio, a television, or a mobile phone. Signal coverage information may indicate, for example, one or more of the following: signal coverage for an area, signal coverage for a route, signal coverage at a location, maximum duration of a service fade, and maximum length of a service fade. Accordingly, in one embodiment, the system may provide a user, such as a wireless service provider, an indication of whether one or more wireless devices may detect and/or process a signal from a radio frequency transmitter at one or more geographic locations. For example, the system may permit a wireless service provider to determine whether the service provider provides adequate coverage to wireless devices within an area or route.

Figure 1:
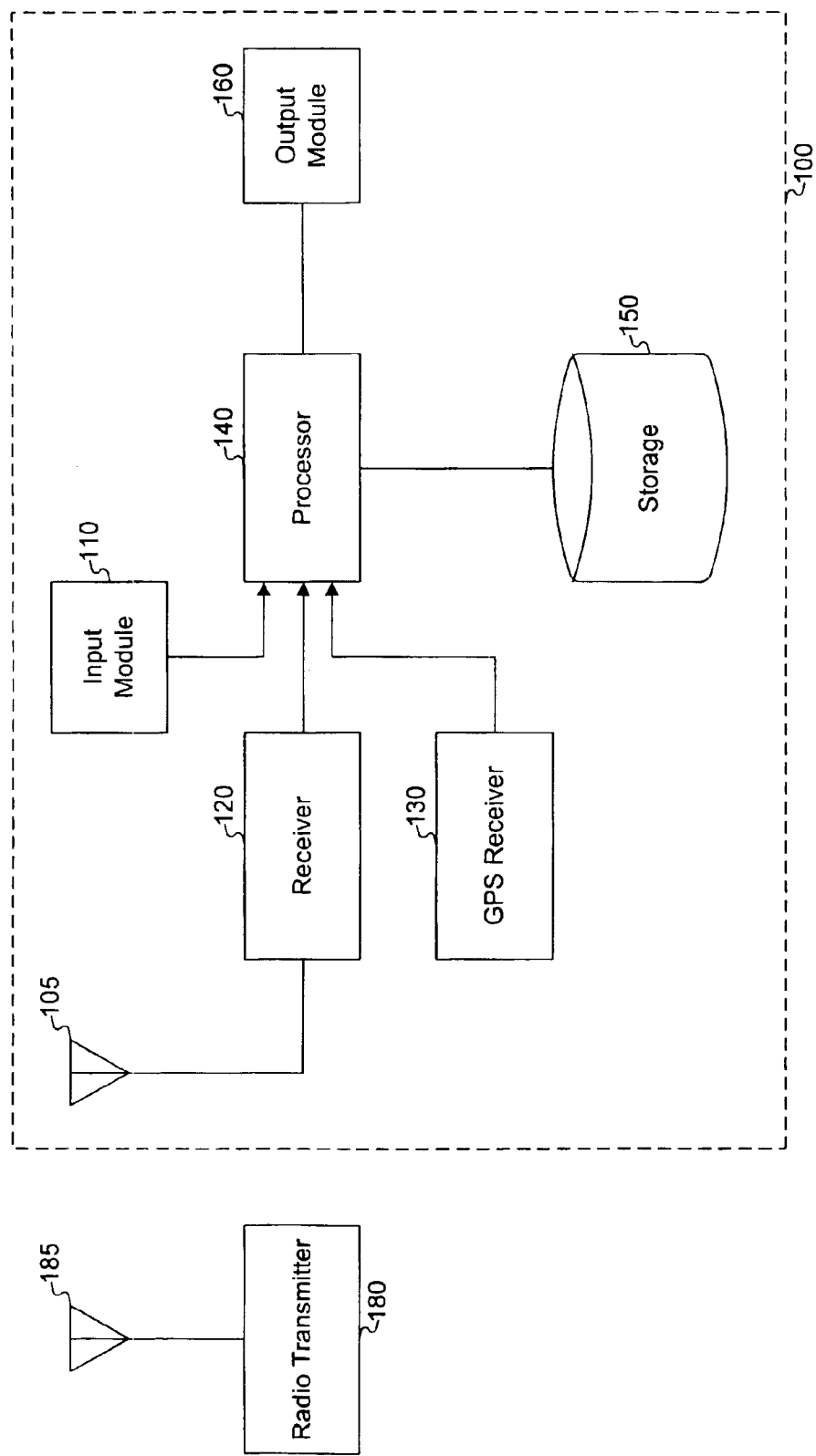
FIG. 1 illustrates a system block diagram for processing signal strength information and position information, consistent with the methods and systems of the present invention.

FIG. 1 shows an exemplary system for determining the signal coverage of a radio frequency transmitter. Referring to FIG. 1, the system 100 includes an antenna 105, a receiver 120, a global positioning system (GPS) receiver 130, a processor 140, a storage module 150, an input module 110, and an output module 160.

The receiver 120 may include a spectrum analyzer or any other device(s) capable of receiving electromagnetic energy and determining the signal strength of a radio transmitter, such as radio transmitter 180 and its corresponding antenna 185.

The GPS receiver may include a standard GPS receiver, for example, a differential GPS receiver, or any other device(s) capable of providing position information including one or more of the following: a latitude, a longitude, a time, a heading, and/or a velocity.

Although FIG. 1 illustrates only a single processor 140, the system 100 may alternatively include a set of processors. The processor 140 may also include, for example, one or more of the following: one or more central processing units, a co-processor, memory, registers, and other data processing devices and systems as appropriate. Moreover, the processor 140 may control the receiver 120 and/or GPS receiver 130; collect and then store information provided by the receiver 120 and/or GPS receiver 130; preprocess and/or process the collected information; estimate a statistic, such as standard deviation, based on the collected information; and determine the signal coverage of a radio frequency transmitter.

In one embodiment, the system 100 may be mobile and placed in a motor vehicle, permitting collection of signal strength information and position information over a coverage area or a route. In this embodiment, a second processor (not shown) may also be used to process the collected information from the mobile system 100, estimate the statistic, and then determine the signal coverage of the radio frequency transmitter.

The input module 110 may be implemented with a variety of devices to receive a user's input and/or provide the input to the processor 140. Some of these devices (not shown) may include, for example, a network interface card, a modem, a keyboard, a mouse, and an input storage device.

The storage module 150 may be embodied with a variety of components or subsystems including, for example, a hard drive, an optical drive, a general-purpose storage device, a removable storage device, and/or other devices capable of storing. Further, although storage module 150 is illustrated in FIG. 1 as being separate or independent from processor 140, the storage module 150 and processor 140 may be implemented as part of a single platform or system.

The radio frequency transmitter 180 and antenna 185 may include, for example, a cellular site transmitter, a satellite transmitter, a broadcast transmitter (e.g., AM or FM transmitter), a wireless networking transmitter, and any other transmitter of electromagnetic energy.

Figure 2:
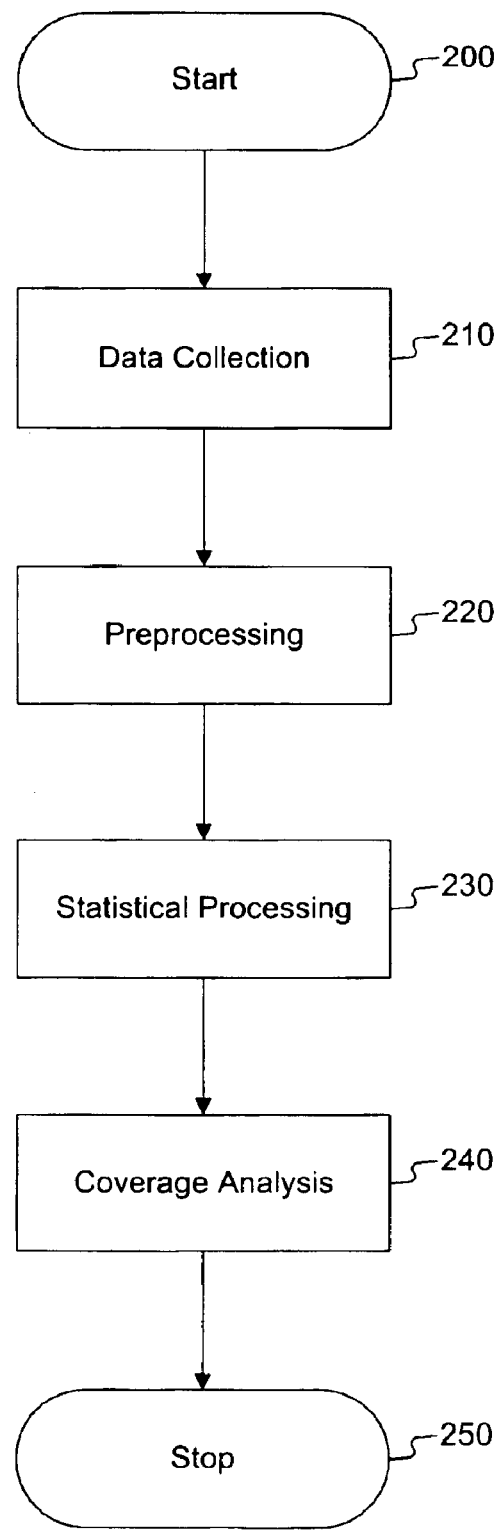
FIG. 2 illustrates a high-level flowchart of a method for determining the signal coverage of a radio frequency transmitter, consistent with the methods and systems of the present invention.

FIG. 2 shows an exemplary flow chart for determining signal coverage of a radio frequency transmitter. Referring to FIG. 2, a system 100 may begin (step 200) by collecting information (step 210) within an area or over a route. The collected information may include signal strength information for a radio frequency transmitter 180 and location (or position) information of the system 100. When collection within the area or over a route is complete, the system 100 may preprocess the collected information (step 220); perform processing, such as statistical processing, (step 230) to estimate a statistic that represents the variations in signal strength, such as variations due to "shadow fading" (i.e., fading from obstruction on the terrain, such as natural and man-made structures); and determine the signal coverage of the radio frequency transmitter (step 240) by providing an indication of received signal strength for the radio frequency transmitter, such as a signal coverage percentage for an area or for a route, a percentage (or value) indicating signal coverage at a location, a duration of a service fade, and/or a length of a service fade.

Figure 3:
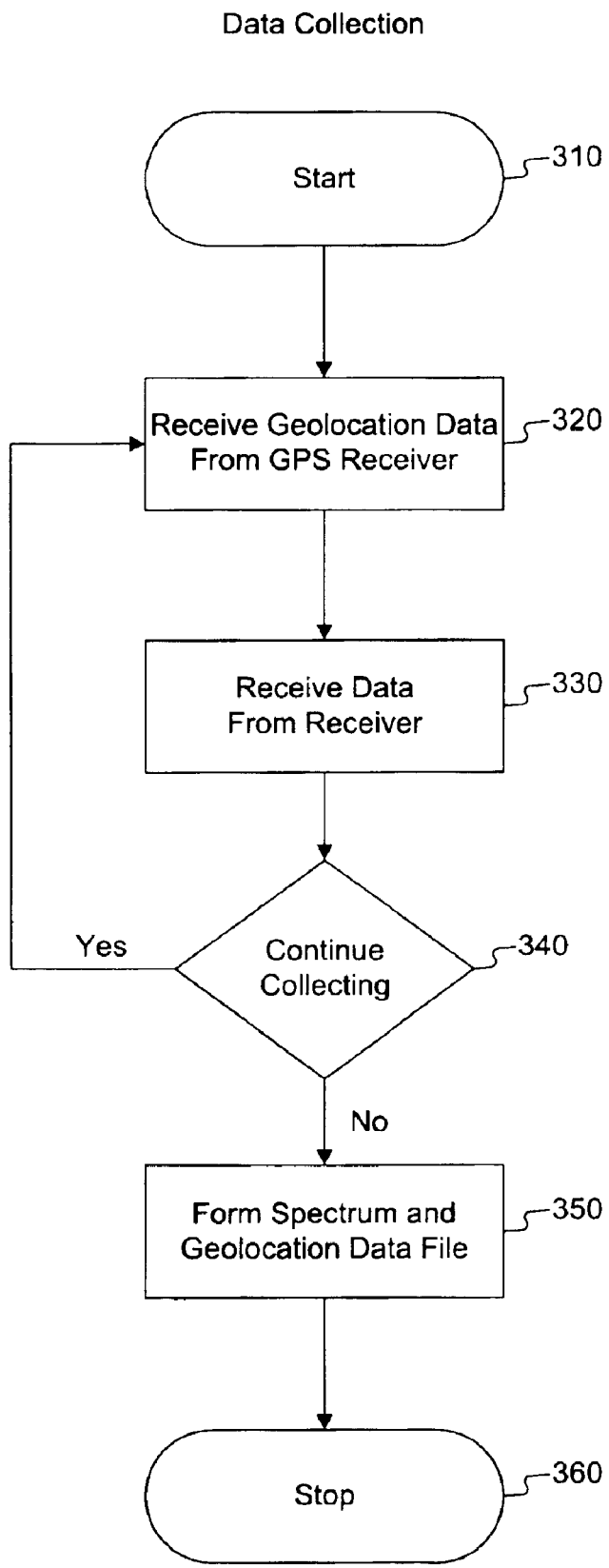
FIG. 3 illustrates an exemplary flowchart for collecting information, in accordance with methods and systems consistent with the present invention.

FIG. 3 illustrates the steps associated with collecting data consistent with the methods and systems of the present invention. Referring to FIG. 3, the system 100 may perform data collection (see, e.g., step 210 at FIG. 2) from a motor vehicle and may collect data at various geographic locations while moving within an area or over a route (step 310). In one embodiment, the processor 140 may receive position information (also referred to hereinafter as geolocation data) from a GPS receiver 130 (step 320). The position information may include, for example, one or more of the following: latitude, longitude, heading, velocity, and time according to GPS (referred to hereinafter as GPS time). The GPS receiver 130 may provide the processor 140 with the position information at various times or at a periodic interval, such as once every second.

The receiver 130 may receive a signal from a transmitter, such as transmitter 180 and antenna 185, and measure the received signal strength associated with the signal. The processor 140 may then receive the measured signal strength information from the receiver 120 (step 330).

In one embodiment, the receiver 120 includes a spectrum analyzer (not shown) that measures the received signal strength of the signal. In this embodiment, the received signal strength of the signal may be measured as power and may be of the form of the following equation:

$$P_r = P_0 \cdot \left(\frac{R_0}{R}\right)^\gamma \cdot \kappa; R \geq R_0 \qquad \text{Equation (1)}$$

where R represents a first distance from the radio transmitter to the receiver, such as distance in the 1 to 20 kilometer range; $R_0$ represents a second distance from the radio transmitter to the receiver; $P_r$ represents the received power (in milliwatts) at distance R (kilometers) from the radio transmitter; $P_0$ represents the power received at distance $R_0$ (kilometers) from the radio transmitter; $\gamma$ represents path loss in the given mobile radio environment (usually referred to as the propagation exponent); and $\kappa$ is a variable correction factor based on the transmitter or receiver. The book titled "Antennas and Propagation for Wireless Communication Systems," Simon R. Saunders, John Willey & Sons, 1999, describes, inter alia, received power and is incorporated herein by reference in its entirety.

The processor 140 may continue collecting (step 340) the received signal strength information and position information until sufficient information from various geographic locations are collected. For example, the system 100 may be installed in a vehicle that drives over a highway. As the system 100 moves along the highway, the processor 140 may receive received signal strength information corresponding to a transmitter (e.g., transmitter 180) and receive position information for the system 100 (i.e., the location of the system 100 on the highway). When the system 100 completes collecting information at various points along the route, the system 100 may stop collecting (No at step 340) and form a file including the received signal strength information and position information (step 350). This file formed by the processor 140 is referred to hereinafter as a spectrum and geolocation data (SGD) file.

The processor 140 may store, in the storage module 150, the SGD file including one or more position velocity (PV) records, received from the GPS receiver 130, and one or more trace (TR) records, received from the receiver 120. The PV record may include, for example, at least one or more of the following: PC time, GPS time, latitude, longitude, velocity, and heading. The TR record may include, for example, at least one or more of the following: PC time, trace (TR) type (e.g., whether the signal trace includes signal samples versus time or signal samples versus frequency), and signal samples. In one embodiment, the processor 140 may receive position information from the GPS receiver 130 and also independently receive signal strength information from the receiver 120. The processor 140 may complete data collection (step 360) by storing the SGD file.

Figure 4:
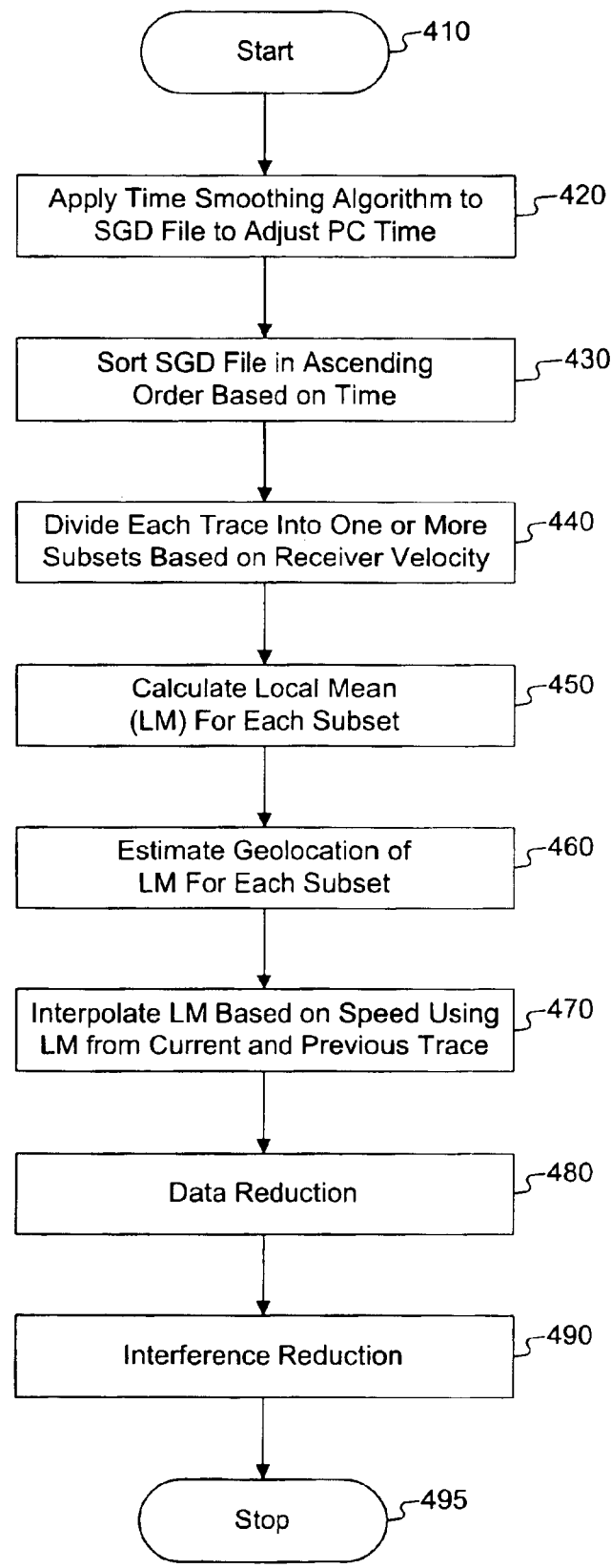
FIG. 4 illustrates an exemplary flowchart for processing collected information, in accordance with methods and systems consistent with the present invention.

FIG. 4 illustrates exemplary steps associated with preprocessing an SGD file. To preprocess the SGD file, the processor 140 may perform, for example, one or more of the following: apply a time smoothing algorithm to the SGD file to adjust the PC time to GPS time (step 420) in the PV records; sort the SGD file in ascending order based on PC time (step 430); divide each TR record into one or more subsets based on the velocity of the receiver 120 (step 440);

calculate a local mean for each of the subsets (step 450); estimate a geolocation for each of the local means (step 460); interpolate, if necessary, a local mean based on the velocity of the receiver 120 (step 470); perform data reduction (step 480); and reject information from interfering signals (step 490).

The SGD file may include, for example, two types of time fields. The first time field is PC time and is based on the internal timing system of the processor 140. The processor 140 may utilize PC time when storing a PV record or a TR record. The second time field corresponds to GPS time and is based on time according to the GPS system. The GPS time may thus indicate the time when the geolocation was made by the GPS receiver 130. Accordingly, when the processor 140 stores a TR or PV record, the processor 140 records a PC time with the record. But when a PV record is stored, the record includes a GPS time and a PC time.

In one embodiment, the system 100 may adjust the one or more PC time values of the PV records into a linear relationship that is defined by the slope and intercept of the one or more GPS time values in the SGD file. This fitting may serve to smooth the one or more PC time values. The PC time values after being smoothed may conform to the following equation:

$$PCtime^* = m \times GPStime + n \qquad \text{Equation (2)}$$

where PCtime* represents the PCtime of each PV record in the SGD file after time smoothing; m represents the slope of the GPS times in the SGD file; and n represents the intercept of the GPS times in the SGD file.

In one embodiment, the slope, m, and the intercept, n, is determined by the following equations:

$$m = \frac{N \cdot \sum_k x_k y_k - \sum_k x_k \cdot \sum_k y_k}{N \cdot \sum_k x_k^2 - \left(\sum_k x_k\right)^2} \qquad \text{Equation (5)}$$

$$n = \frac{\sum_k y_k \cdot \sum_k x_k^2 - \sum_k x_k \cdot \sum_k x_k y_k}{N \cdot \sum_k x_k^2 - \left(\sum_k x_k\right)^2} \qquad \text{Equation (6)}$$

where y represents one or more PC time values; x represents one or more GPS time values; and k varies from 1 to N and represents the $k^{th}$ PV record of an SGD file containing N records.

To sort the SGD file in ascending order based on time (step 430), the processor 140 may sort the PV and TR records in the SGD file based on PC time values. For example, the processor 140 may sort the PV and TR records in ascending or descending order.

FIG. 5A shows an exemplary table of PV and TR records after the processor 140 performs time smoothing (step 420) and sorting (step 430). Referring to FIG. 5A, the first record is a PV record including a PC time of "60449.56," a latitude of "40.77072," a longitude of "−74.0281," a velocity of "38" miles per hour, and a GPS time of "297" seconds. The second record is a TR record corresponding to the spectrum (i.e., received signal strength over time) of a signal, such as the signal from transmitter 180. The TR record includes a PC Time of "60450.39," a trace type (TR type) of "2" to indicate that the signal trace corresponds to signal samples over an interval of time, and received signal strength values (i.e., the signal samples) of −"115.93," "−113.87," "−116.0," "−120.0," "−121.0," and "−121.1." Although this record only shows six received signal strength values, a skilled artisan may recognize that additional received signal strength values may also be stored with the TR record. Moreover, the received signal strength values may be based on a signal trace representing the samples of the signal at one or more time instants or frequencies.

Figure 5B:
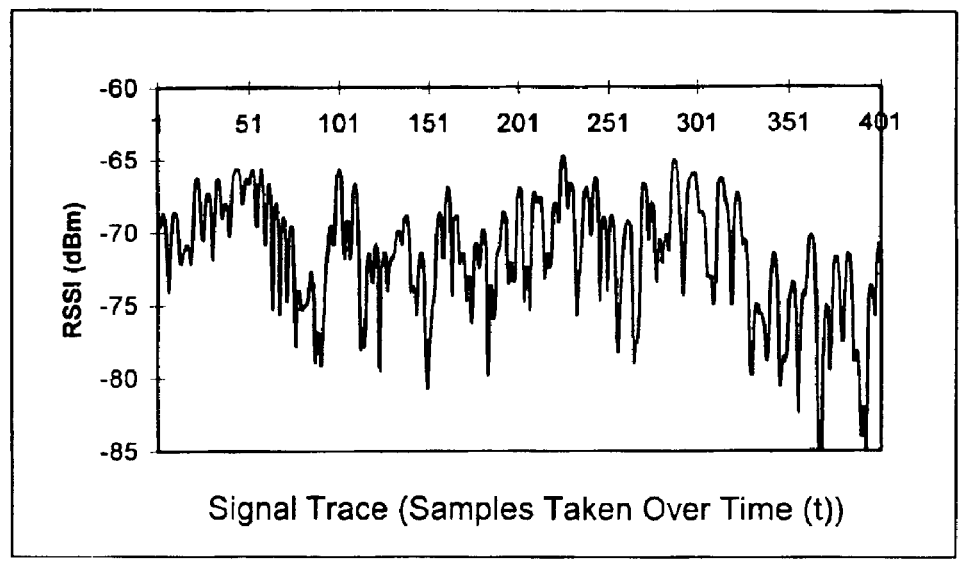
FIG. 5B illustrates an exemplary signal trace, in accordance with methods and systems consistent with the present invention.

FIG. 5B shows an exemplary signal trace from receiver 120 with received signal sample values measured at one or more times. The received signal strength values for each TR record represents the measured samples at one or more times. The processor 140 may store the signal trace in the TR record as received signal strength information, as shown in FIG. 5A. Alternatively, a skilled artisan may recognize that the signal trace may instead represent samples of the signal measured at one or more frequencies.

When the records of the SGD file have been time smoothed and sorted, the processor 140 may then divide each trace of the TR record into one or more subsets based on the velocity of the receiver 120 (step 440). In one embodiment, the processor 140 may determine the distance covered by the receiver 120 based on the receiver velocity. The processor 140 may then divide each trace into one or more subsets such that no subset is larger than a distance, such as 40 times the wavelength of the transmitter. For example, a transmitter at 1.2 GHz may have a wavelength of 0.25 meters. In this example, each trace may be divided into one or more subsets such that each of the subsets would be less than or equal to 10 meters (i.e., 40 times the wavelength of 0.25 meters). Although 10 meters is used as the distance, any other distance may be used instead.

Figure 5C:
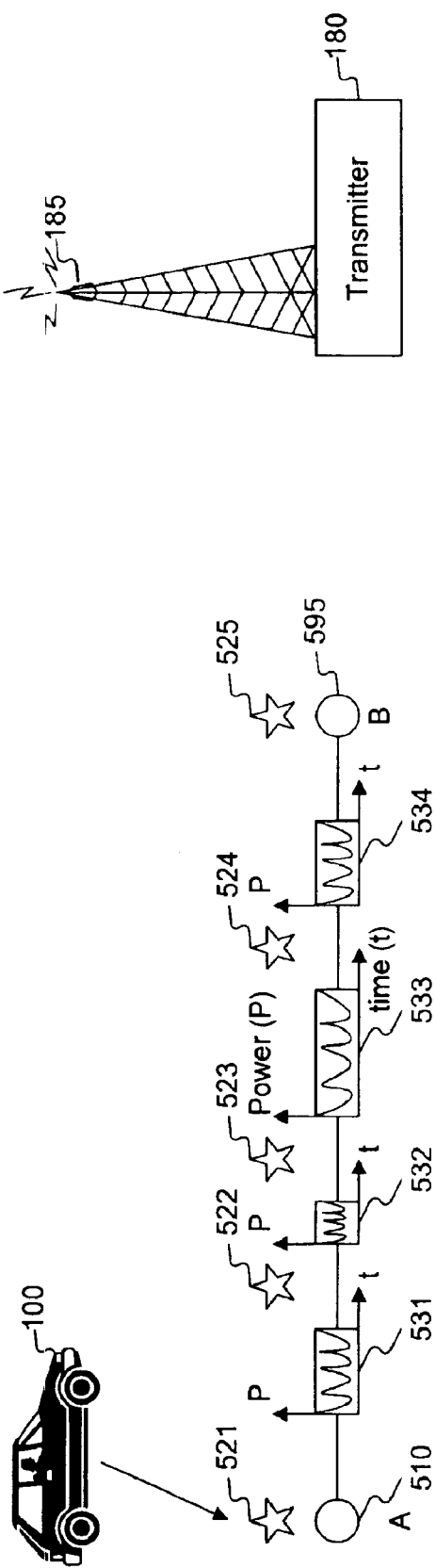
FIG. 5C illustrates collecting information, in accordance with methods and systems consistent with the present invention.

FIG. 5C illustrates the system 100 collecting data from the radio transmitter 180 at various geographic locations between the route from A 510 to B 595. The stars 521–525 represent when the system 100 receives geolocation information from the GPS receiver (not shown). The signal traces 531–534 represent received signal strength information (see, e.g., FIG. 5B) collected over a 1-second interval. Since the system 100 varies its speed while traveling from point A 510 to point B 595, the signal traces 531–534 correspond to different distances. That is, a 1-second signal trace collected while traveling at 60 miles per hour represents 26.8 meters. On the other hand, a 1-second signal trace collected while traveling at 30 miles per hour represents 13.4 meters. To limit the maximum distance associated with any one signal trace, the processor 140 may divide the signal trace (i.e., the received signal strength information) within each TR record into one or more subsets based on the velocity of the receiver 120 (step 440).

Referring again to FIG. 5B, the sample represents a distance of less than 10 meters and may thus be divided into a single subset, forming a single TR record with received signal strength information including "−115.93," "−113.87," "−116," "−120," "−121," and "−121.1," as shown in FIG. 5A. Although this example includes a single subset, a TR record may alternatively be divided a plurality of subsets.

To calculate a local mean for each of the subsets (step 450), the processor 140 may average the received signal strength information with each subset. In one embodiment, the first TR record of FIG. 5A may be divided into a single subset and the received signal strength values for the subset may be averaged. In this example, the local mean for the first TR record of FIG. 5A is the average of "−115.93," "−113.87," "−116," "−120," "−121," and "−121.1" (or "−117.08 dBm, averaged in the linear domain). The processor 140 may repeat determining the local mean for all of the TR records and the corresponding subset(s) in the SGD file.

To estimate a position for each of the local means (step 460), the processor 140 may associate a location (or geolocation) with each local mean determined in step 450. The processor 140 may estimate a location for a local mean based on the PV record preceding and the PV record following the local mean. For example, referring to FIG. 5A, the first TR record is preceded by a PV record taken at "60449.56" and is followed by a PV record at "60451.56."

To determine a geolocation for a local mean, the following equation may be used:

$$Lg(\tau_k) = \frac{Lg_2 - Lg_1}{t_2 - t_1}(\tau_k - t_1) + Lg_1 \quad \text{Equation (5)}$$

$$Lt(\tau_k) = \frac{Lt_2 - Lt_1}{t_2 - t_1}(\tau_k - t_1) + Lt_1 \quad \text{Equation (6)}$$

where $Lg_1$, $Lt_1$, $t_1$ represent the longitude, latitude, and time, respectively, for the PV record preceding the TR record for the subset for which the position is being estimated; $Lg_2$, $Lt_2$, $t_2$ represent the longitude, latitude, and time, respectively, for the PV record after the subset for which the position is being estimated; and $\tau_k$ is a time associated with the $k^{th}$ local mean (e.g., the time associated with the $k^{th}$ subset of the given TR record). The processor 140 may use Equations 5 and 6 for each TR record and its corresponding subsets in the SGD file.

The processor 140 may interpolate a local mean when the distance exceeds a predetermined distance (step 470). The processor 140 may determine the distance between two consecutive local means using location information for each of the consecutive local means. When the distance exceeds the predetermined threshold, the processor 140 may use two consecutive local means to interpolate a new local mean and a corresponding location. In one embodiment, the processor 140 may use a predetermined threshold of a distance corresponding to the average velocity multiplied by the average time between TR records, where the average velocity may be calculated based on the PV records. For example, when the distance between two consecutive local means exceeds the predetermined threshold, the processor 140 may average the two consecutive local means and corresponding locations. The processor 140 may then use the average local mean and average location information as an interpolated local mean. The processor 140 may also insert the interpolated local mean into the SGD file. In one embodiment, the processor 140 may not perform step 470 when the time difference between consecutive PV records exceeds 2 seconds.

FIG. 6 shows the SGD file of FIG. 5A after estimating the location for each subset (step 460) and interpolating (step 470). In one embodiment, after performing steps 460 and 470, the processor 140 may create a second file, referred to herein after as an m-file, as shown in the exemplary table of FIG. 6. The fields in the m-file of FIG. 6 include longitude (Long), latitude (Lat), local mean, velocity of receiver (v), LaGrange Interpolation (Lagr-Intp), average, and difference. For example, the local mean "−113.8" includes a longitude of "−74.0283," a latitude of "40.77081," a velocity of "39.14" mph, a Lagr-Intp value of "0." Moreover, the record with a Lagr-Intp value of "1" is a record that is interpolated. The processor 140 may use the average and difference fields to determine one or more statistics, as described in additional detail below.

The processor 140 may also perform data reduction on the m-file (step 480) to remove redundant values for the same location. For example, if the system 100 collects data while in a stationary position (e.g., while stopped at a red light), the SGD file or the m-file may include one or more local means for the same location. The processor 140 may thus average the repeated local means and location information into a single local mean at that location. Alternatively, the processor 140 may delete the repeated local means and location information to remove the redundant values.

To reject interfering signals (step 490), the processor 140 may also monitor the frequency. For example, when the receiver 120 measures the received signal strength of a signal of interest (e.g., the frequency of the transmitter 180), the processor 140 may store in storage module 150 the received signal strength for the signal of interest and discard signal strength measurements that do not correspond to the frequency of the signal of interest, such as measurements from an interfering signal.

Figure 7A:
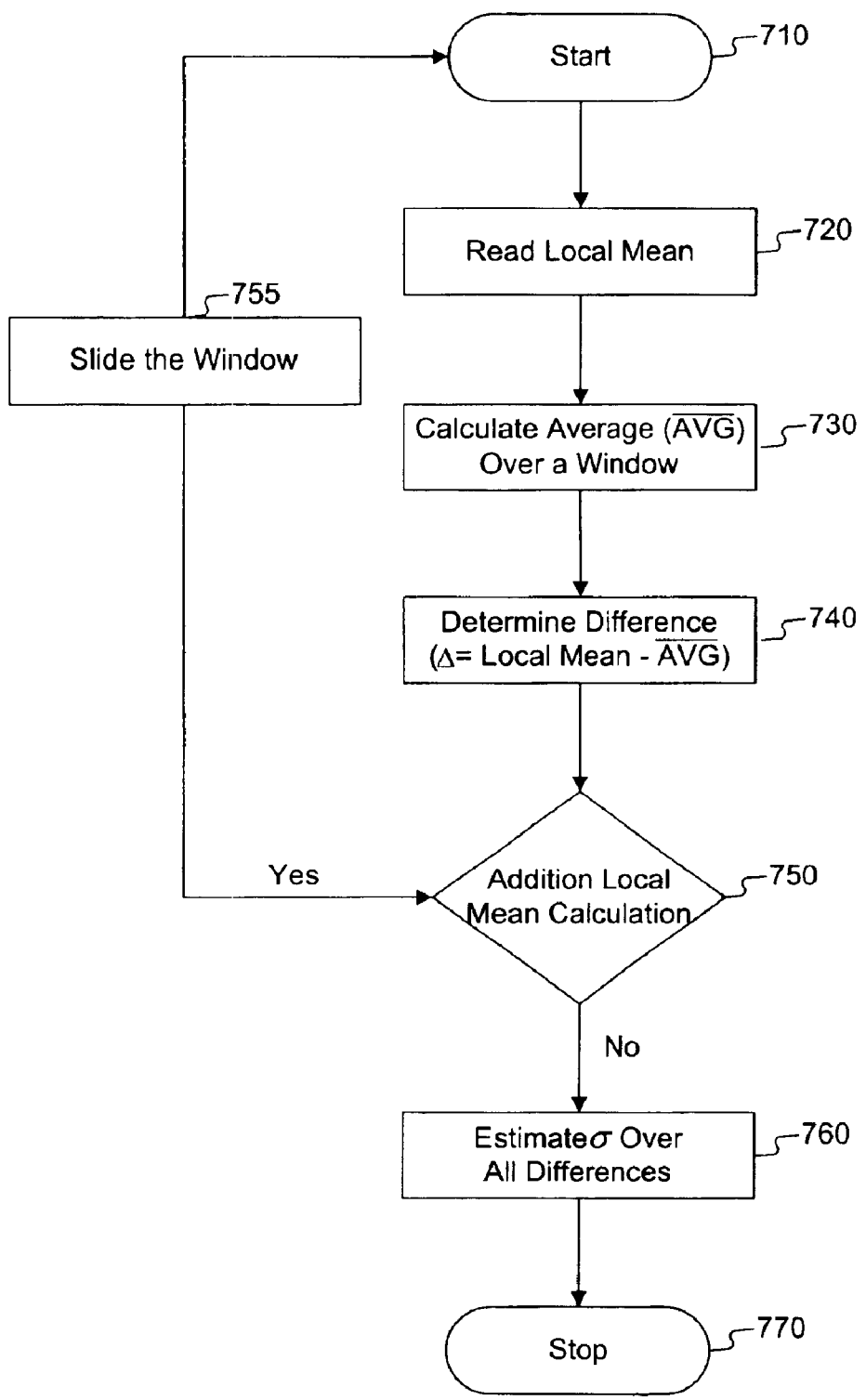
FIG. 7A illustrates an exemplary flowchart for determining a statistic, in accordance with methods and systems consistent with the present invention.

FIG. 7A shows exemplary steps for statistically processing a file, such as the m-file, to determine a statistic, such as a standard deviation. The processor 140 may read the local mean from the SGD file of FIG. 6 (step 720); calculate an average over a window (step 730); and determine a difference between the local mean and the window average (step 740). The processor 140 may also determine whether additional local means need processing (step 750). If so (yes at step 750), the processor 140 may slide the window (step 755) and repeat steps 720–750 for another local mean. When additional local means do not need processing (no at step 750), the processor 140 may estimate a standard deviation (a) from all the differences calculated in step 740. Although a standard deviation is used, a skilled artisan may recognize that any other statistic may be used instead, such as a variance, or higher order moment.

To read the local mean from the m-file (step 720), the processor 140 may read the m-file stored in the storage module 150. For example, processor 140 may read the first record associated with the first local mean, such as the values from the first record of FIG. 6 (see, e.g., record number 1 of FIG. 6).

To calculate an average over a window (step 730), the processor 140 may compute the average over a predetermined window. FIG. 7B shows FIG. 6, with the window average stored in the first record of the window (i.e., record 1). Referring to FIG. 7B, the predetermined window (see, e.g., the first window 790 of FIG. 7B) may include a window size of 2 records. With a window size of 2 records, the processor 140 may compute a window average by averaging the local means for the first and second records of FIG. 7B. The processor 140 may then associate the window average with the first record in the window (e.g., record 1). In this example, the processor 140 may assign the window average of −113.4 dBm to record number 1.

On the other hand, in one embodiment, the processor 140 may calculate an average over a predetermined window that includes an odd number of records, such as five records. With a window size of five records, the processor 140 computes a window average by averaging the local means for five of the records of FIG. 7B. For example, the processor 140 may determine the window average for records 1–5 and then associate the window average to the middle record (i.e., record 3). In this example, the processor 140 may assign the window average of −112.02 (i.e., the average of −113.8, −113.06, −111.58, −110.78, and −111.6) to record number 3. The processor 140 may then slide the window to include records 2-6. In one embodiment, the window average may be a Gaussian window (also referred to as a normal window) that calculates a weighted average across the Gaussian window (e.g., five records) such that the determined window average is associated with the center record of the window.

A skilled artisan may recognize that other window sizes may be used instead. By way of example, the window size may be selected based on the frequency (or wavelength) of the signal received by receiver 120. In one embodiment, the window size may correspond to a 25 meter window at 500 MHz band, a 40 meter window at frequencies within the very high frequency (VHF) range, and a 20 meter window at frequencies within ultra high frequency (UHF) range of the electromagnetic spectrum. In one embodiment, a large window size may include terrain contributions that impact the local means (e.g., increasing the standard deviation of the local mean). For example, with a window size of 25 meters, the window average (step 730) would include the average of the local mean of the first record with any other record that is within a distance of 25 meters from the first record. The articles titled "Propagation at 500 MHz for mobile radio," Davis et al., IEE Proc. 132, Pt. F, No. 8, 1985, and "Signal strength prediction in urban areas," Parsons et al., IEE Proc., 130, Pt.F, No.5, 1983, describe inter alia, window sizes and are both incorporated herein by reference in its entirety.

To determine a difference between a local mean and a window average (step 740), the processor 140 may subtract the window average from the local mean. Referring again to FIG. 7B, this difference may be stored in the column labeled "Difference."

Figure 7C:
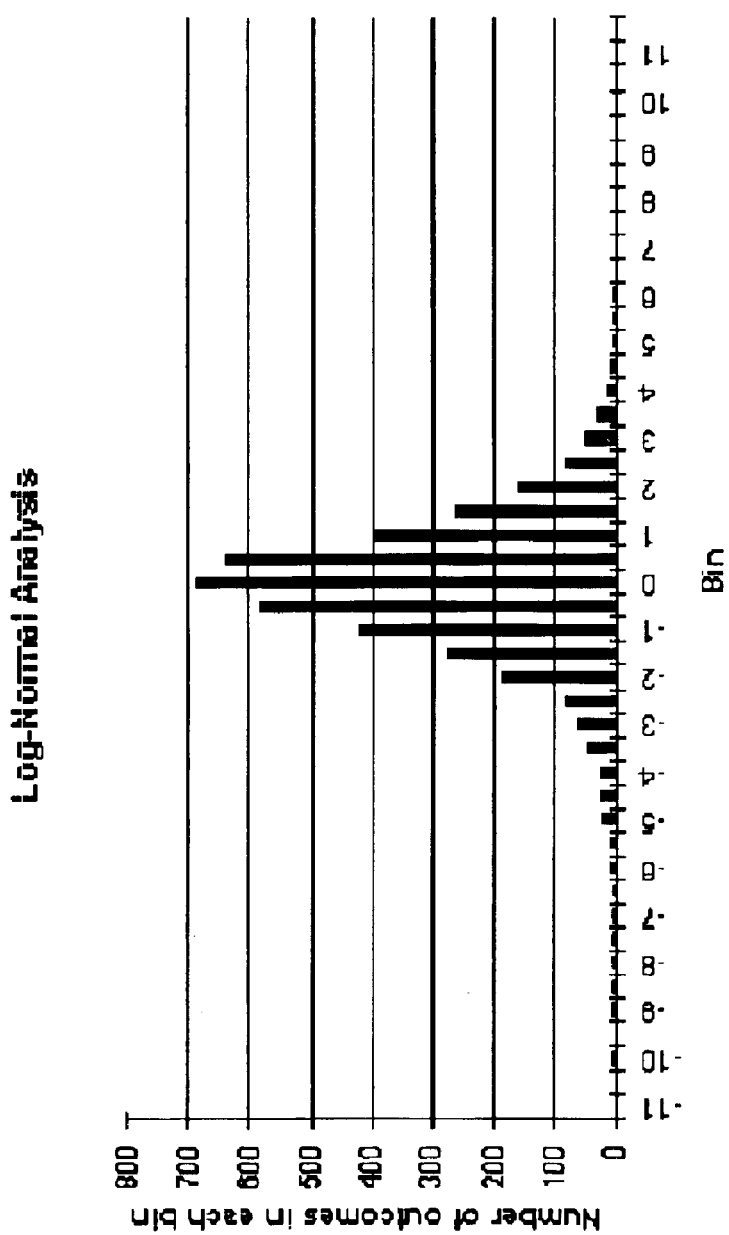
FIG. 7C illustrates a histogram of difference values determined in accordance with methods and systems consistent with the present invention.

FIG. 7C shows a histogram of the difference values determined in step 740 (see, e.g., "Difference" values of FIG. 7B). When the processor 140 uses a window size that yields a lognormal distribution, as shown in FIG. 7C, the processor 140 may be using the correct window size. In one embodiment, the processor 140 may vary the window size until a distribution approximating that of a lognormal distribution is realized. Moreover, the lognormal distribution of FIG. 7C may suggest that the difference values correspond to shadow fading, such as fading produced by obstructions on the terrain, rather than slow fading, such as fading produced by slow variations in the terrain.

To determine whether additional local means need processing (step 750), the processor 140 may determine whether additional records include local means without a corresponding window average and difference. If so, the processor 140 slides the window (step 755) by moving (or sliding) the window over by one record. Referring again to FIG. 7B, with a window distance of two records, the window would slide from the first window 790 to the second window 795, which includes records 2 and 3.

The processor 140 may then repeat steps 720–750 by, for example, reading the local mean of −113.06 (step 720) from record 2 (see FIG. 7B); calculating a window average over the second window, resulting in a new window average of −112.2 (i.e., the linear average of −113.06 and −111.58) (step 730); computing a difference of 1.06 (step 740); and determining whether additional local means remain to be processed (step 750).

When the processor 140 computes all of the differences based on the local means and window average, the processor 140 may use all of the difference values to compute a statistic, such as a standard deviation ($\sigma$) (step 760). The standard deviation of all the difference values may be computed according to the following equation:

$$\sigma = \sqrt{\frac{n\sum x_i^2 - (\sum x_i^2)}{n(n-1)}}\qquad\text{Equation (7)}$$

where n is the number of records in the m-file (e.g., 7 in FIG. 7B); and $x_i$ represents the $i^{th}$ difference value; and i varies from 1 to n.

Figure 8:
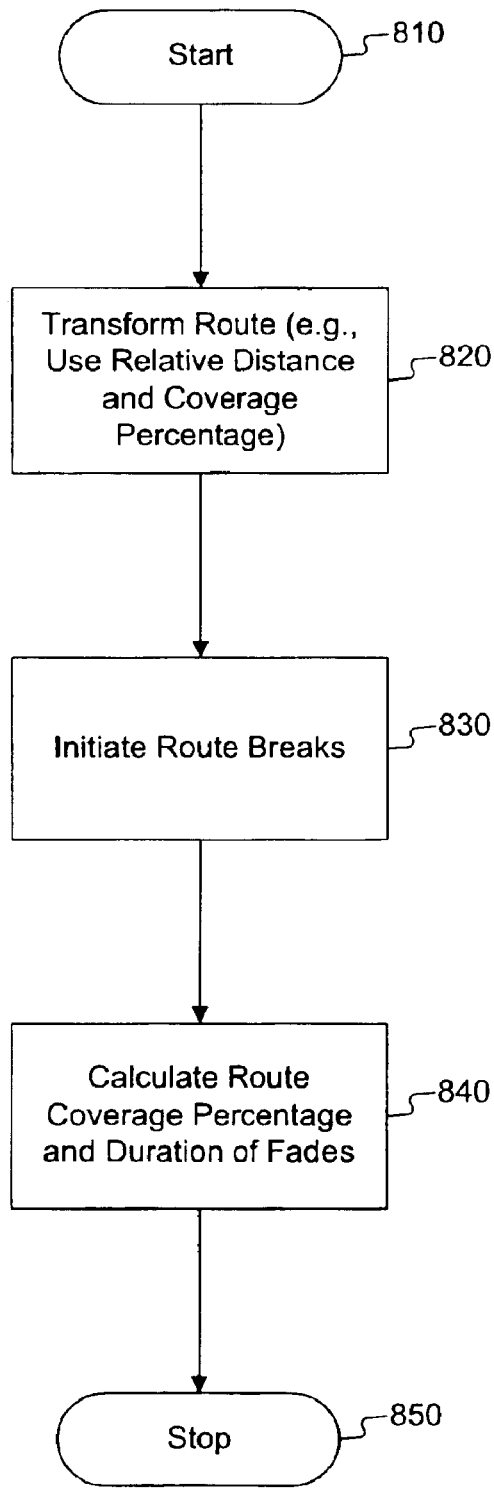
FIG. 8 illustrates an exemplary flow chart for determining the signal coverage for a wireless device along a route, in accordance with methods and systems consistent with the present invention.

FIG. 8 illustrates the steps associated with determining signal coverage, consistent with the systems and methods of the present invention. Referring to FIG. 8, a processor 140 may start the steps associated with determining signal coverage (step 810) when the processor receives a statistic, such as the standard deviation, describing the received signal strength information (see, e.g., step 760 of FIG. 7A). The processor 140 may then use an m file and transform the location information in the m-file into a route (step 820); initiate route breaks when the distance between adjacent records is too long (step 830); and calculate signal coverage over the route (step 840) or sub-routes, providing an indication of signal strength along the route or sub-route.

To transform the m-file into a route (step 820), the processor 140 may transform each local mean and corresponding location information, such as latitude, longitude, velocity, and heading, into a route with relative distance, direction, and velocity.

In one embodiment, the position information for each record within the m-file is represented as a position vector. For example, the $k^{th}$ record in an m-file may include the $k^{th}$ position vector describing a geographic location. The $k^{th}$ position vector, S(k), may correspond to the following equation:

$$S(k)=[\text{Longitude}(k),\ \text{Latitude}(k),\ \text{velocity}(k),\ \text{heading}(k),\ LM(k)]\qquad\text{Equation (8)}$$

where S(k) represents the $k^{th}$ position vector; Longitude(k) represents the longitude value of the $k^{th}$ position vector; Latitude(k) represents the latitude value of the $k^{th}$ position vector; velocity(k) represents the velocity of a receiver (e.g., receiver 120 or GPS receiver 130) for the $k^{th}$ record; heading(k) represents the heading of the receiver for the $k^{th}$ record; and LM(k) represents the local mean of the $k^{th}$ record.

The vector S(k) is transformed to a new vector, D(k), representing a route. The route, D(k), may be consistent with the following equation:

$$D(k)=[\Delta(k),\ \text{velocity}(k),\ \text{heading}(k),\ LM(k)]\qquad\text{Equation (9)}$$

where the latitude and longitude information of S(k) is replaced with relative distance $\Delta(k)$ from the previous record, such as distance in feet from the previous record.

Figure 9:
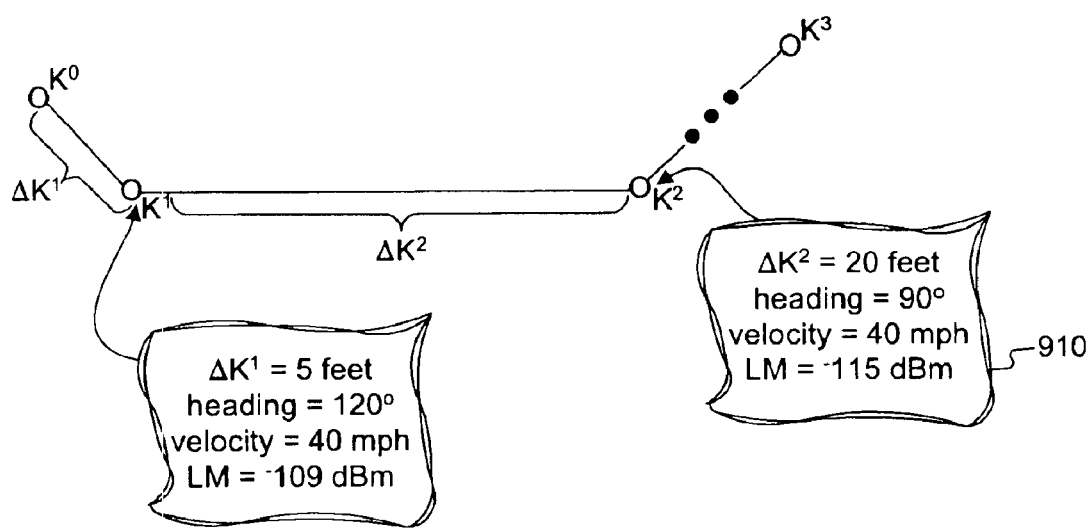
FIG. 9 illustrates a route, in accordance with methods and systems consistent with the present invention.

FIG. 9 shows an exemplary route for records $K^0$–$K^3$. Referring to FIG. 9, the route segment between $K^1$ and $K^2$ 910 includes a distance of 20 feet ($\Delta K^2$), a heading of 90 degrees, a velocity of 40 miles per hour, and a local mean of −115 dBm.

To initiate a route break, the processor 140 may determine whether a route segment, such as route segment $\Delta K^1$ and $\Delta K^2$ of FIG. 9, exceeds a predetermined route segment distance (referred to hereinafter as a break distance). When the route segment exceeds the break distance, the processor 140 may divide the route into two sub-routes. The processor 140 may then determine coverage for each of the sub-routes. To determine whether a route break is required, the processor 140 may evaluate the distances, such as $\Delta K^1$ and $\Delta K^2$, between points along a route. For example, if the distance between locations $K^1$ and $K^2$ exceeds the break distance, the processor 140 may divide the route into sub-routes.

In one embodiment, the predetermined route break distance is selected such that it is smaller than the distance required to determine the duration of a service fade. The duration of a service fade is the amount of time a wireless device (or receiver) fails to detect or process a signal because the signal is less than the minimum power required by the receiver. The amount of time also corresponds to a distance, such as the distance traveled by the receiver during the service fade or the distance associate with a TR record. For example, to detect a service fade of a short duration, such as 30 seconds, the processor 140 may require a relatively short route segment distance, such as 1000 feet. On the other hand, to detect a longer service fade, of 2 minutes, the route segment distance may also be longer, such as 4000 feet.

With the route break, the processor 140 may compute the signal coverage, such as signal coverage percentage and duration of a fade, along the first sub-route (e.g., $K^0$ to $K^1$) and the second sub-route ($K^2$ to $K^3$), wherein $\Delta K^2$ may be used as a break in the route. The coverage along the route, $R_{cp}$, may be determined as a weighted sum of signal coverage percentages for the route segments (or sub-routes), $Cp(\bar{k})$, wherein the weighted sum is normalized by the route length. $R_{cp}$ may correspond to a single value characterizing the signal coverage percentage along the entire route. The route coverage, $R_{cp}$, may be computed with the following equation:

$$R_{cp} = \frac{\sum_k C_p(k) \cdot \Delta(k)}{\sum_k \Delta(k)} \quad \text{Equation (10)}$$

where $C_p(k)$ is the signal coverage percentage at a point (e.g., points $K_0$, $K_1$, $K_2$, and $K_3$ of FIG. 9) along the route; and $\Delta(k)$ is the relative distance from a preceding point.

For each location $\bar{k}$ along a route, the processor 140 may calculate a signal coverage percentage based on the local mean for the $k^{th}$ location along the route, the standard deviation (see, e.g., step 760 at FIG. 7), and a service threshold ($w_t$) for a wireless device (or receiver) of interest.

The service threshold ($w_t$) may represent the smallest signal strength required by a wireless device (or receiver) to detect and process a received signal. For example, a wireless device, such as a cell phone, may have a service threshold of −80 dBm. To determine the signal coverage percentage for the cell phone, the processor 140 may set a service threshold of −80 dBm. A local mean (see, e.g., FIG. 6) below the service threshold of −80 dBm represents a service fade. That is, the wireless devise, such as a cell phone, may not be able to detect and/or process a signal weaker than −80 dBm, resulting in an interruption (or fade) in reception. When a route includes multiple local means at various locations along the route, some of the local means may be weaker than the service threshold, representing a service fade. If consecutive local means are weaker than the service threshold, the service fade has a duration corresponding to the time or distance associated with the consecutive local means.

A skilled artisan may also recognize that the signal coverage percentage for additional wireless devices with different service thresholds (e.g., −100 dBm) may also be determined by using a different service threshold. Accordingly, the system may enable a wireless service provider to determine signal coverage for one or more wireless devices over an area or route.

The coverage percentage, $Cp(\bar{k})$, may be represented by the following equation:

$$Cp(r) = Prob\{w \geq w_t\} = \frac{1}{2} - erf \frac{w_t - LM(r)}{\sigma_{LM}} \quad \text{Equation (11)}$$

where r represents distance; $\sigma_{LM}$ represents the standard deviation (see, e.g., FIG. 7A at step 760); LM(r) represents the local mean at distance r along a route; and erf is a normal distribution error function of the following form:

$$erf(x) = \int_0^y \frac{1}{\sqrt{2\pi}} e^{-\frac{x^2}{2}} dx. \quad \text{Equation (12)}$$

Although the standard deviation is used, one of ordinary skill will recognize that determining signal coverage along a route may be utilized without using the standard deviation determined in step 760 of FIG. 7A.

In one embodiment, the system 100 may collect information including signal strength from a radio frequency transmitter 180 and location (or position) information for the system 100. When collection of an area or route is complete, the system 100 may preprocess the collected information; and perform processing, such as statistical processing, (step 230) to estimate a statistic, such as a standard deviation, representing "shadow fading" (i.e., fading from natural and man-made structures on the surface of the earth that obstruct the reception of the receiver 120).

In one embodiment, by using the standard deviation of the differences (see, e.g., FIG. 7A at step 740) between each local mean and the window average, the system 100 may reduce the contribution of terrain when determining signal coverage over a route or area. The contributions from terrain are also referred to as slow fading. Moreover, by reducing the contributions of terrain, the system 100 may primarily include contributions from shadow fading (i.e., variations in the signal strength from man-made or natural structures on the terrain) in the determination of signal coverage.

A wireless service provider using the system 100 may require less signal strength to service a route or an area since the variations based on terrain have been reduced, or eliminated, from signal coverage determination. On the other hand, a service provider not using the system 100 may need to provide additional signal power to account for signal variations associated with terrain along the route.

By way of example, when the signal coverage percentage is determined without reducing the contribution from terrain, the signal coverage percentage may correspond to a signal coverage percentage of 90% for the route. When the contributions from terrain are reduced or eliminated, the system 100 may provide a signal coverage percentage of, for example, 98%. Accordingly, the present invention may provide an indication of signal coverage over an area or route. Moreover, the indication of signal coverage may also provide received signal strength indications of an area or route with less variation than past approaches by reducing the influence of terrain on such indications by estimating the contribution due to shadow fading.

In one embodiment, the processor provides signal coverage information that includes the number of fades with the corresponding duration for all of the fades over a route of a given distance. For example, the processor may provide the user with signal coverage information indicating that for a 15 mile route, 5 fades occurred with an aggregate duration of 5 minutes. In another embodiment, the processor simply provides a coverage percentage for the entire route using equation 9 above. For example, the processor may output to the user a coverage percentage of 99% over a 15 mile route. The processor 140 may also provide the signal coverage percentage over each segment of the route.

Moreover, in one embodiment, the system 100 may provide field strength data and statistical processing, enabling high-resolution and accurate signal coverage determination at a location and/or along a route. Furthermore, the resolution and accuracy may be utilized in environments with small cells, where location resolution is a concern. For example, the system 100 may enhance ray-tracing prediction tools that locate service fades in environments with small cells, such as microcells. In addition, the system may allow derivation of received envelope statistics, such as a probability density function, average duration of fades, and level crossing rates.

The above embodiments and other aspects and principles of the present invention may be implemented in various environments. Such environments and related applications may be specially constructed for performing the various processes and operations of the invention or they may include a general-purpose computer or computing platform selectively activated or reconfigured by program code (also referred to as code) to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the present invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include for example micro-code, machine code, such as produced by a compiler, and files containing a high-level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for processing signal strength information from a radio frequency transmitter comprising the steps of:

receiving signal strength information indicating a power for the radio frequency transmitter at one or more first locations;

receiving location information representing a geographic location for one or more second locations;

dividing the received signal strength information into one or more subsets of signal strength information, such that the one or more subsets are determined based on a speed of a receiver of the received signal strength information and a corresponding distance associated with the speed;

determining, for each of the one or more subsets, a local mean, such that the local mean represents an average for one of the one or more subsets;

estimating a location for the local mean based on the received location information;

determining at least one distance between the estimated location and another estimated location based on the speed of the receiver and the signal strength information.

2. The method of claim 1, further comprising the step of:

interpolating the local mean when the at least one distance exceeds a predetermined distance.

3. The method of claim 1, wherein said step of determining further comprises the step of:

determining a plurality of local means such that each local mean corresponds to one of the one or more subsets.

4. The method of claim 3, wherein said step of determining further comprises the step of:

averaging one or more of the plurality of local means to provide a window average.

5. The method of claim 4, wherein said step of averaging further comprises the step of:

determining a difference value based on one of the plurality of local means and the window average.

6. The method of claim 5, wherein said step of averaging further comprises the step of:

determining a plurality of difference values.

7. The method of claim 6, further comprising the step of:

calculating a standard deviation based on the plurality of difference values.

8. The method of claim 7, further comprising the step of:

determining a signal coverage at a location for a wireless device based on the following equation:

$$Cp(r) = \frac{1}{2} - erf \frac{w_t - LM(r)}{\sigma_{LM}}$$

wherein r represents the location, $\sigma_{LM}$ represents the standard deviation, LM(r) represents the local mean corresponding to the location, $w_t$ represents a service threshold for the wireless device, and erf is a normal distribution error function.

9. The method of claim 8, wherein said step of determining the signal coverage further comprises the step of:

defining the location as at least one of the one or more first locations.

10. The method of claim 1, further comprising the step of:

defining the one or more first locations as locations that differ from the one or more second locations.

11. A method for processing signal strength information from a radio frequency transmitter comprising the steps of:

receiving signal strength information indicating a power for the radio frequency transmitter at one or more first locations, wherein the signal strength information includes a set of signal strength data based on a signal trace;

receiving location information representing a geographic location for one or more second locations, wherein the received location information for one or more second locations includes one or more of the following: a latitude, a longitude, or at least one of a plurality of first time stamps from a receiver of global positioning system information;

attaching at least one of a plurality of second time stamps to the set of signal strength data;

smoothing the plurality of second time stamps based on the plurality of first time stamps;

dividing the received signal strength information into one or more subsets of signal strength information, such that the one or more subsets are determined based on a speed of a receiver of the received signal strength information;

determining, for each of the one or more subsets, a local mean such that the local mean represents an average for one of the one or more subsets;

estimating a location for the local mean based on the received location information.

12. The method of claim 11, wherein said smoothing further comprises the step of:

smoothing the plurality of second time stamps based on a slope for the plurality of first time stamps.

* * * * *